United States Patent
Guo et al.

(10) Patent No.: US 7,812,513 B2
(45) Date of Patent: Oct. 12, 2010

(54) FIELD EMISSION CATHODE AND PLANAR LIGHT SOURCE USING THE SAME

(75) Inventors: Cai-Lin Guo, Beijing (CN); Li Qian, Beijing (CN); Jie Tang, Beijing (CN); Liang Liu, Beijing (CN); Bing-Chu Du, Beijing (CN); Zhao-Fu Hu, Beijing (CN); Pi-Jin Chen, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 561 days.

(21) Appl. No.: 11/438,010

(22) Filed: May 19, 2006

(65) Prior Publication Data

US 2007/0063630 A1    Mar. 22, 2007

(30) Foreign Application Priority Data

Sep. 22, 2005    (CN) .................. 2005 1 0037510

(51) Int. Cl.
*H01J 1/62* (2006.01)

(52) U.S. Cl. ..................................... 313/496; 313/562

(58) Field of Classification Search .................. 313/495, 313/310, 496, 497; 445/24

See application file for complete search history.

(56) References Cited

U.S. PATENT DOCUMENTS

| | | | |
|---|---|---|---|
| 5,578,900 A | | 11/1996 | Peng et al. |
| 5,866,978 A | * | 2/1999 | Jones et al. .................. 313/495 |
| 6,630,772 B1 | * | 10/2003 | Bower et al. ................. 313/311 |
| 6,741,019 B1 | * | 5/2004 | Filas et al. ................... 313/355 |
| 6,876,141 B2 | | 4/2005 | Filho et al. |
| 7,157,848 B2 | * | 1/2007 | Tang et al. ................... 313/495 |
| 2003/0006684 A1 | * | 1/2003 | Kawate et al. .............. 313/311 |
| 2006/0175950 A1 | * | 8/2006 | Itou et al. .................... 313/311 |

FOREIGN PATENT DOCUMENTS

| JP | 2003-303541 A | | 10/2003 |
|---|---|---|---|
| JP | 2003303541 A | * | 10/2003 |

OTHER PUBLICATIONS

PDF Machine Translation of JP 2003303541 A.*

* cited by examiner

*Primary Examiner*—Joseph L Williams
*Assistant Examiner*—Andrew J Coughlin
(74) *Attorney, Agent, or Firm*—Jeffrey T. Knapp

(57) ABSTRACT

An exemplary field emission cathode includes an electrically conductive layer and an electron-emitting member formed thereon. The electron-emitting member includes an electron-emitting material configured for emitting electrons and a getter material configured for collecting outgassed materials. An exemplary planar light source includes an anode and a cathode spaced apart from the anode. The anode includes a first electrically conductive layer and a fluorescent layer formed on an inner surface of the first electrically conductive layer. The cathode includes a second electrically conductive layer and an electron-emitting member formed on an inner surface of the second electrically conductive layer which faces toward the fluorescent layer. The electron-emitting member includes an electron-emitting material and a getter material.

9 Claims, 3 Drawing Sheets

US 7,812,513 B2

FIELD EMISSION CATHODE AND PLANAR LIGHT SOURCE USING THE SAME

TECHNICAL FIELD

This invention relates generally to field emission devices, and more particularly to a field emission cathode and a planar light source using the same.

BACKGROUND

Carbon nanotubes are very small tube-shaped structures having the composition of a graphite sheet, formed as a tube. Carbon nanotubes produced by arc discharge between graphite rods were first discovered and reported in an article by Sumio Iijima entitled "Helical Microtubules of Graphitic Carbon" (Nature, Vol. 354, Nov. 7, 1991, pp. 56-58).

Carbon nanotubes typically have excellent performance; in particular, good electron emission capability at low emission voltages, generally less than 100 volts. Furthermore, carbon nanotubes can carry high electric currents reliably. Due to these properties, carbon nanotubes are considered to be an ideal field emission material for application in a variety of field emission devices, such as planar light sources, field emission flat panel displays, etc.

A conventional nanotube-based planar light source typically includes a rear plate formed with a cathode, a face plate formed with an anode spaced apart from the cathode, and a vacuum cavity having a certain vacuum level defined between the rear plate and the face plate. The cathode usually includes a cathode conductive layer and a plurality of carbon nanotubes acting as an electron-emitting material formed on the cathode conductive layer. The anode usually includes a transparent anode conductive layer and a fluorescent layer formed on the anode conductive layer. However, the vacuum of the planar light source can degrade, during operation of the device, due to outgassing from the fluorescent layer. Outgassing primarily occurs when energetic electrons emitted from the electron-emitting material strike the fluorescent layer and cause trapped substance to be released. Absorption of the outgassed materials on the electron-emitting material may contaminate the electron-emitting material and result in large fluctuation in the emitted current of the electron-emitting material, even causes irreversible damage to the electron-emitting material. The outgassed materials may be atoms, molecules, atom clusters, ions, free radicals, etc. Common potential moleculars include, for example, $O_2$, $H_2$, $N_2$, $NH_3$, $CO_2$, $CO$ and $H_2O$. Therefore, an adequate vacuum maintenance in the planar light source is a critical factor to provide a high stability emitted current.

What is needed is to provide a field emission cathode and a planar light source using the same, which can achieve a high stability emitted current.

SUMMARY

A preferred embodiment provides a field emission cathode includes: an electrically conductive layer, and an electron-emitting member formed on the conductive layer. The electron-emitting member includes an electron-emitting material and a getter material. The electron-emitting material is configured for emitting electrons. The getter material is configured for collecting outgassed materials.

In another preferred embodiment, a planar light source includes an anode and a field emission cathode spaced apart from the anode. The anode includes a first electrically conductive layer and a fluorescent layer formed on an inner surface of the first electrically conductive layer. The field emission cathode includes a second electrically conductive layer and an electron-emitting member formed on an inner surface of the second electrically conductive layer which faces toward the fluorescent layer. The electron-emitting member includes an electron-emitting material and a getter material. The electron-emitting material is configured for emitting electrons to strike the fluorescent layer. The getter material is configured for collecting outgassed materials during the operation of the planar light source.

The field emission cathode and the planar light source in accordance with preferred embodiments can achieve a high stability emitted current, due to the electron-emitting member includes a getter material being in close proximity to an electron-emitting material of the electron-emitting member and having a large surface area distribution.

Other advantages and novel features will become more apparent from the following detailed description of embodiments when taken in conjunction with the accompanying drawings.

BRIEF DESCRIPTION OF THE DRAWINGS

Many aspects of the present field emission cathode and planar light source can be better understood with reference to the following drawings. The components in the drawings are not necessarily to scale, the emphasis instead being placed upon clearly illustrating the principles of the present field emission cathode and planar light source. Moreover, in the drawings, like reference numerals designate corresponding parts throughout the several views.

The exemplifications set out herein illustrate various preferred embodiments, in various forms, and such exemplifications are not to be construed as limiting the scope of the present field emission cathode and planar light source in any manner.

DETAILED DESCRIPTION OF PREFERRED EMBODIMENTS

Embodiment 1

Figure 1:
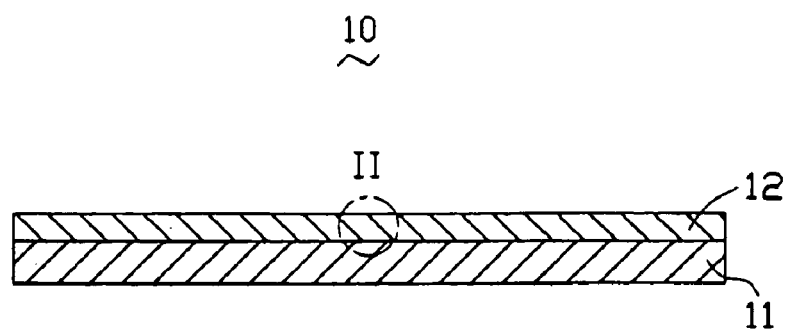
FIG. 1 is a schematic, cross-sectional view of a field emission cathode in accordance with a first embodiment.
Figure 2:
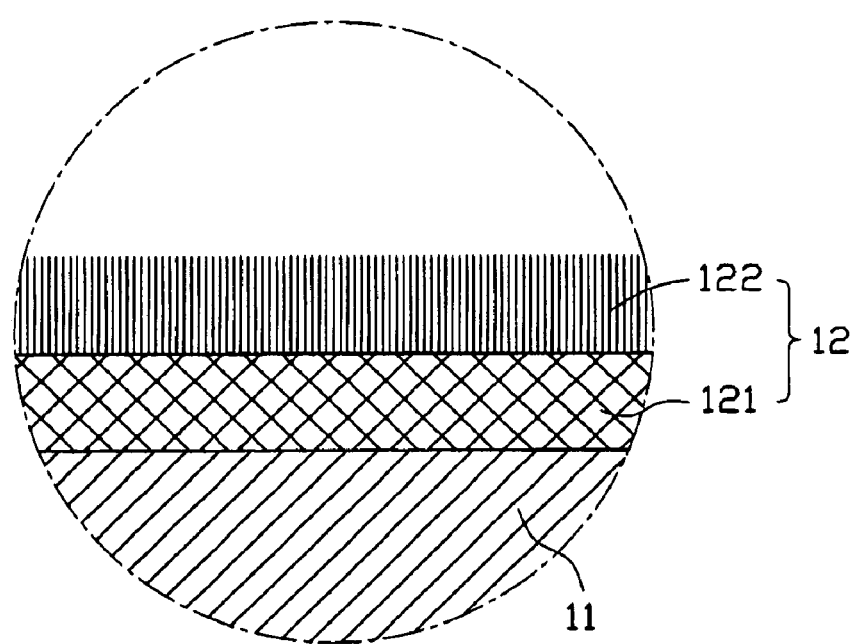
FIG. 2 is an enlarged view of the circled portion II of FIG. 1.

Referring to FIGS. 1-2, a field emission cathode 10 is shown in accordance with the first embodiment. The field emission cathode 10 includes an electrically cathode conductive layer 11, and an electron-emitting member 12 formed on and electrically contacting with the cathode conductive layer 11 (as shown in FIG. 1). The cathode conductive layer 11 is generally made of indium-tin oxide.

As shown in FIG. 2, which is an enlarged view of the circled portion II of FIG. 1. The electron-emitting member 12 includes a getter material in form of layer 121 and an electron-emitting material in form of layer 122. The getter material layer 121 is in contact with the cathode conductive layer 11. The electron-emitting material layer 122 is formed on a surface of the getter material layer 121 which faces away from the cathode conductive layer 11. The electron-emitting material layer 122 can be excited by an external energy such as an electric field, to emit electrons. The emitted electrons can be used to strike a fluorescent material whereby light is emitted, as well as outgassed materials. Generally, the outgassed materials may be atoms, molecules, atom clusters, ions, free radicals, etc. Common potential moleculars include, for example, $O_2$, $H_2$, $N_2$, $NH_3$, $CO_2$, CO and $H_2O$. The getter material layer 121 can be used to collect the outgassed materials to minimize the contamination of the electron-emitting material layer 122 resulting from the outgassed material.

The getter material layer 121 is made from a non-evaporable getter material, for example, titanium (Ti), zirconium (Zr), thorium (Th), a rare earth metal, or an alloy thereof. The getter material layer 121 can be formed on the cathode conductive layer 11 via a screen printing method, an electroplating method, or other suitable deposition methods.

The electron-emitting material layer 122 can be composed of carbon nanotubes which have an excellent electron emission capability. In the illustrated embodiment, the carbon nanotubes are substantially perpendicular to a surface of the getter material layer 121 which faces away from the cathode conductive layer 11. Advantageously, each of the carbon nanotubes has a length in the range from 5 to 15 microns. The method for preparing the carbon nanotubes can be a chemical vapor deposition method, an arc discharge method, a laser ablation method, or other methods suitable for synthesizing carbon nanotubes.

Embodiment 2

Figure 3:
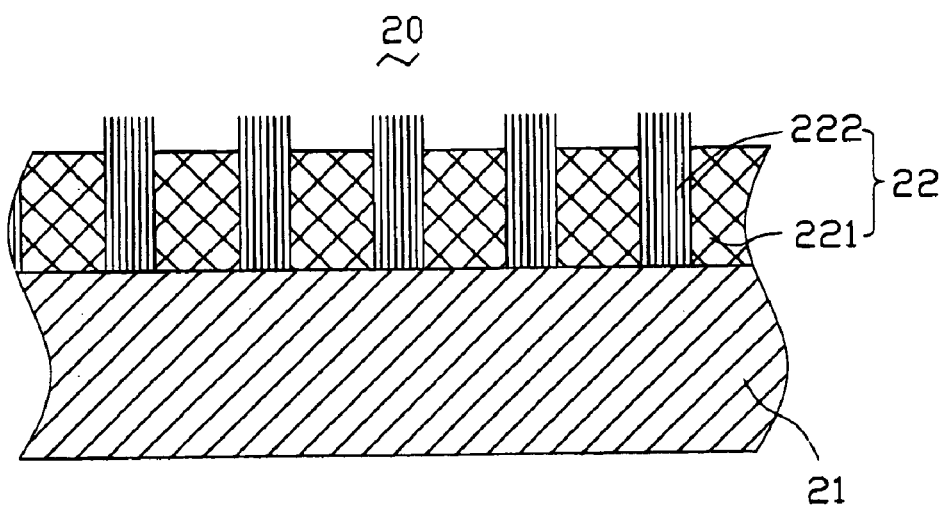
FIG. 3 is a schematically enlarged, partially cross-sectional view of a field emission cathode in accordance with a second embodiment.

Referring to FIG. 3, a field emission cathode 20 is shown in accordance with the second embodiment. The field emission cathode 20 includes an electrically cathode conductive layer 21 and an electron-emitting member 22 formed on and electrically contacting with the cathode conductive layer 21. The cathode conductive layer 21 is generally made of indium-tin oxide.

The electron-emitting member 22 includes a getter material in form of layer 221 and an electron-emitting material in form of layer 222. The getter material layer 221 has a pattern defining a plurality of through openings (not labeled). The electron-emitting material layer 222 has a reverse pattern corresponding to that of the getter material layer 221 and is disposed in the openings. That is, the electro-emitting material layer 222 is surrounded by the getter material layer 221 and in contact with the cathode conductive layer 21. Advantageously, the electron-emitting material layer 222 has a thickness greater than that of the getter material layer 221.

In the illustrated embodiment, the electron-emitting material layer 222 is composed of substantially aligned carbon nanotubes. The getter material layer 221 is composed of a non-evaporable getter material, for example, titanium (Ti), zirconium (Zr), thorium (Th), a rare earth metal, or an alloy thereof.

Embodiment 3

Figure 4:
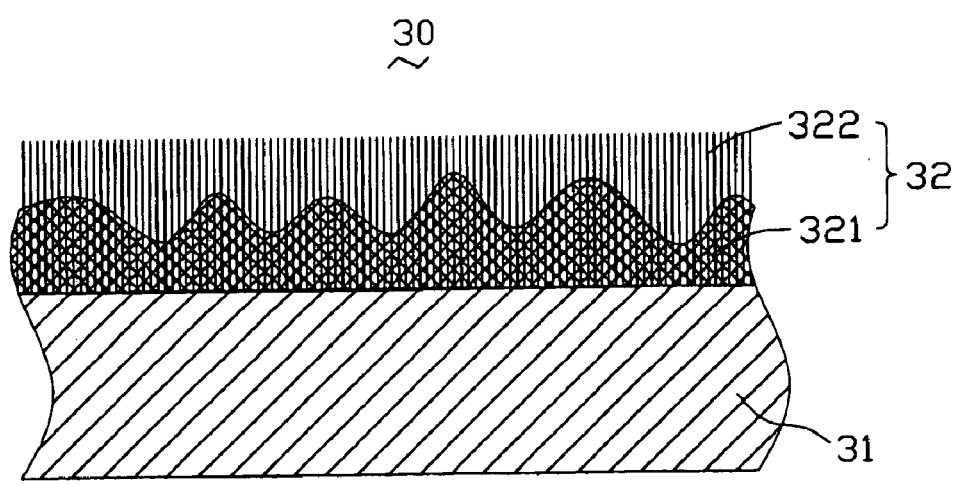
FIG. 4 is a schematically enlarged, partially cross-sectional view of a field emission cathode in accordance with a third embodiment.

Referring to FIG. 4, a field emission cathode 30 is shown in accordance with the third embodiment. The field emission cathode 30 includes an electrically cathode conductive layer 31 and an electron-emitting member 32 formed on and electrically contacting with the cathode conductive layer 31. The cathode conductive layer 31 is generally made of indium-tin oxide. The electron-emitting member 32 is made from a mixture of a getter material 321 and an electron-emitting material 322.

In the illustrated embodiment, the electron-emitting material 322 is a plurality of carbon nanotubes. The getter material 321 is a non-evaporable getter material, includes, for example, titanium (Ti), zirconium (Zr), thorium (Th), a rare earth metal, or an alloy thereof. The formation of such an electron-emitting member 32 is actually the product of a series of substeps. A slurry mixture of a non-evaporable getter material and carbon nanotubes is first prepared. Subsequently, the slurry is screen printed or coated on the cathode conductive layer 31 to form a layer thereon. After the layer is dried, a surface of the layer which faces away from the cathode conductive layer 31 is rubbed to generate an electrostatic force thereat. Due to an effect of the electrostatic force, tips of at least part of the carbon nanotubes are exposed from the layer, even the exposed tips thereof are parallel to one another. Accordingly, the electron-emitting member 32 formed on the cathode conductive layer 31 can be obtained.

Figure 5:
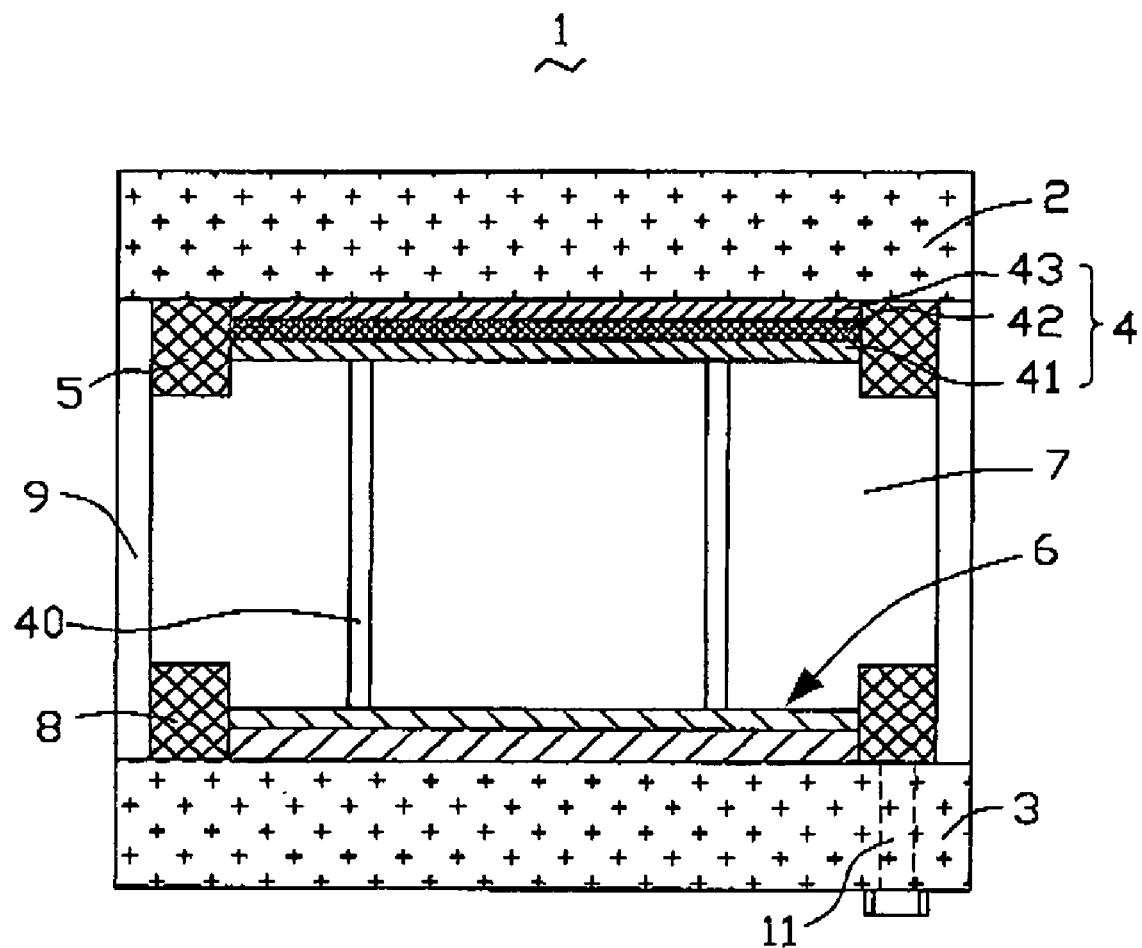
FIG. 5 is a schematic, cross-sectional view of a planar light source using one of the field emission cathodes of FIG. 2, FIG. 3 and FIG. 4, in accordance with a preferred embodiment.

A planar light source 1 using one of the field emission cathodes 10, 20, 30 as above described in accordance with a preferred embodiment will be described below with reference to FIG. 5. The planar light source 1 can serve as a backlight source for a liquid crystal display (LCD) or an illumination source.

The planar light source 1 generally includes a face substrate 2, a rear substrate 3 opposite to the face substrate 2, an anode 4, a field emission cathode 6 and a sealing member 9. The anode 4 is formed on the face substrate 2. The field emission cathode 6 facing toward the anode 4 is formed on the rear substrate 3. The anode 4 and the field emission cathode 6 are spaced apart from each other. The sealing member 9 is interposed between and in contact with the face substrate 2 and the rear substrate 3 to thereby form a cavity 7 in the planar light source 1. Both the face substrate 2 and the rear substrate 3 generally are made of a transparent material, includes, for example, glass.

Usually, a plurality of spacers 40 are placed between, the anode 4 and the field emission cathode 6, to prevent the atmospheric pressure external to the planar light source 1 from distorting the face substrate 2 after evacuation of the planar light source 1. The cavity 7 is evacuated through the exhaust tube 11 by vacuum pumping devices (not shown), and then sealed off to maintain a certain vacuum in the planar light source 1.

The anode 4 generally includes an electrically conductive layer 43 and a fluorescent layer 42. The conductive layer 43 is formed on an inner surface of the face substrate 2 which faces toward the rear substrate 3. The fluorescent layer 42 is formed on a surface of the conductive layer 43 which faces toward the rear substrate 3. The conductive layer 43 is generally made of indium-tin oxide.

The field emission cathode 6 is configured for emitting energetic electrons when a voltage being applied on the anode 4 and the field emission cathode 6, to strike the fluorescent layer 42 whereby light is emitted, as well as outgassed materials. The field emission cathode 6 can be one of the field emission cathodes 10, 20, 30 as described above, which includes a getter material and an electron-emitting material. Due to a large surface area distribution of the getter material and its in close proximity to the electron-emitting material, the outgassed materials produced during the operation of the planar light source 1 can be efficiently collected by the getter material, and then the contamination of the electron-emitting material resulting from the outgassed materials can be minimized. Accordingly, the planar light source 1 can achieve a high stability emitted current.

In order to further improve the luminosity of the planar light source 1, the anode 4 further includes an aluminum film 41 formed on the fluorescent layer 42. The aluminum film 41 usually has an optimum thickness of about 50 nanometers. Energetic electrons emitted from the field emission cathode 6 can pass through the thin aluminum film 41 and then strike the fluorescent layer 42 whereby light is emitted. In this case, the aluminum film 41 can serve as a reflector.

Preferably, a getter material in form of layer 5 is formed in a gap defined between the anode 4 and the sealing member 9. A getter material in form of layer 8 is formed in a gap defined between the field emission cathode 6 and the sealing member 9. Advantageously, the getter material layers 5, 8 surround the anode 4 and the field emission cathode 6 respectively. Each the getter material layers 5, 8 can be made from a non-evaporable getter material, for example, titanium (Ti), zirconium (Zr), thorium (Th), a rare earth metal, an alloy thereof. The buildings of the getter materials 5, 8 further facilitate the vacuum maintenance of the planar light source 1.

It is understood that the electron-emitting material layer as described above, also can be composed of other materials such as diamond tips, diamond-like carbon (DLC) tips, silicon tips, or tip-shaped metal materials (e.g., tungsten tips), besides carbon nanotubes. The field emission cathodes 10, 20, 30 can be used in other field emission devices, such as field emission flat panel displays, besides the planar light source 1.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A planar light source, comprising:
   an anode comprising a first electrically conductive layer and a fluorescent layer formed on the first electrically conductive layer; and
   a field emission cathode spaced apart from the anode, the field emission cathode comprising a second electrically conductive layer, a getter layer and an electron-emitting layer, the getter layer being disposed on the second electrically conductive layer, the electron-emitting layer being electrically connected with the second electrically conductive layer and facing toward the fluorescent layer, the electron-emitting layer comprising an electron-emitting material capable of emitting electrons to strike the fluorescent layer, and the getter layer collecting outgassed materials during the operation of the planar light source;
   wherein the electron-emitting layer and the getter layer are two separate layers, the electron-emitting layer is located on the getter layer, the getter layer is disposed directly between the electrically conductive layer and the electron-emitting layer.

2. The planar light source of claim 1, wherein the anode further comprises a reflector comprising an aluminum film, the reflector is formed on the fluorescent layer and faces toward the electron-emitting layer.

3. The planar light source of claim 1, further comprising a plurality of spacers placed between the anode and the field emission cathode.

4. The planar light source of claim 1, wherein the electron-emitting layer comprises a plurality of carbon nanotubes substantially parallel to each other.

5. The planar light source of claim 1, wherein the getter layer comprises a non-evaporable getter material.

6. The planar light source of claim 1, further comprising a first substrate, a second substrate and a sealing member, wherein the first electrically conductive layer is disposed on the first substrate the second electrically conductive layer is disposed on the second substrate, the sealing member is interposed between the first substrate and the second substrate thereby forming a cavity enclosing the anode and the field emission cathode therein.

7. The planar light source of claim 6, further comprising a getter material formed in a gap defined between the field emission cathode and the sealing member.

8. The planar light source of claim 6, further comprising a getter material formed in a gap defined between the anode and the sealing member.

9. The planar light source of claim 1, wherein the material of the getter material is selected from titanium, zirconium, thorium, and rare earth metal.

* * * * *